United States Patent
Friedman et al.

(10) Patent No.: US 7,320,071 B1
(45) Date of Patent: Jan. 15, 2008

(54) SECURE UNIVERSAL SERIAL BUS

(75) Inventors: Hezi Friedman, Ramat Hasharon (IL); Gadi Erlich, Mosha Hadar Am (IL); Ohad Falik, Kfar Saba (IL); Daivid Briet, Nof Ayalon (IL)

(73) Assignee: National Semiconductor Corporation, Santa Clara, CA (US)

( * ) Notice: Subject to any disclaimer, the term of this patent is extended or adjusted under 35 U.S.C. 154(b) by 1495 days.

(21) Appl. No.: 09/862,986

(22) Filed: May 22, 2001

(51) Int. Cl.
*G06F 9/00* (2006.01)
*G06F 11/30* (2006.01)
*H04L 9/00* (2006.01)

(52) U.S. Cl. .................. 713/165; 713/194; 713/189; 726/13

(58) Field of Classification Search .......... 710/100, 710/129; 718/1; 370/351, 398, 401; 713/165, 713/189, 194; 726/13
See application file for complete search history.

(56) References Cited

U.S. PATENT DOCUMENTS

| | | | | |
|---|---|---|---|---|
| 5,799,196 A | * | 8/1998 | Flannery | 713/320 |
| 6,216,183 B1 | * | 4/2001 | Rawlins | 710/100 |
| 2002/0141418 A1 | * | 10/2002 | Ben-Dor et al. | 370/398 |
| 2002/0144115 A1 | * | 10/2002 | Lemay et al. | 713/168 |

* cited by examiner

*Primary Examiner*—Kambiz Zand
*Assistant Examiner*—Christopher J Brown

(57) ABSTRACT

An apparatus and method for providing a secure universal serial bus (USB) is disclosed. The secure USB comprises a secure channel for transferring data. A secure USB domain device is coupled to a host computer or is embedded within a host computer. The secure USB domain device comprises a USB memory device, a USB processor, a USB host controller, and an internal USB bus coupled to each of the elements of the secure USB domain device. The elements of the secure USB domain device are not accessible by the host computer. The secure USB domain device blocks the transmission of confidential information, enables the transmission of non-confidential information, and enables the transmission of encrypted confidential information.

19 Claims, 3 Drawing Sheets

SECURE UNIVERSAL SERIAL BUS

FIELD OF THE INVENTION

The present invention relates to data management in computer systems that utilize a Universal Serial Bus (USB). More particularly, the invention relates to an apparatus and method for providing a secure USB channel between USB devices and non-USB devices over a conventional USB.

BACKGROUND OF THE INVENTION

In a typical personal computer (PC), a peripheral device is attached to a single communication port. A typical PC generally comprises two serial communication ports and one parallel communication port. This arrangement imposes limitations on the number of peripherals that can be attached to the PC and imposes certain difficulties in adding and removing the peripherals. Typically, peripherals that are mounted outside the PC are connected through a communication port. But there are usually only a few communication ports available. Alternatively, a peripheral device may be attached to a PC through an adapter attached to one of the bus slots of the PC motherboard. This approach requires managing computer resources and requires a careful configuration of the device.

A Universal Serial Bus (USB) solves many types of PC input/output (I/O) problems (e.g., configuration, resources management, port connection, etc.). A USB also provides additional new I/O capabilities. A USB enables the simultaneous connection of many peripheral devices on one bus. Moreover, the connection of USB devices may be performed by simply plugging the peripheral device into the USB bus. When a USB peripheral is connected, it is automatically detected, characterized, and configured by the system without requiring any user interaction. Devices may be added or removed while the PC is powered up and running, so that switching the power off is not required.

To understand the present invention it is necessary to understand USB operations. Therefore it is necessary to describe USB operations in detail. FIG. 1 schematically illustrates an exemplary USB tiered-star topology 120. USB topology 120 comprises three elements. The three elements are a Host computer ("Host") 100, Hub devices 110-113, and Functions F1-F6 ("USB devices"). These three elements work together to allow data to flow between Host 100 and the USB devices.

USE Host Controller 103 organizes the data in the form of data packets. USE Host Controller 103 also controls the flow of data and control information over a USB bus (shown schematically in FIG. 1). Host 100 comprises USB Client Software 101 and USB System Software 102. Each USB device has its dedicated Client Software that Host 100 utilizes to interact with each of the USB devices. The USB System Software 102 manages interactions between USB Host Controller 103 and Client Software 101. The Functions F1-F6 are actually different types of USB devices, such as a USB keyboard or a USB mouse. Functions F1-F6 are able to transmit or receive data or control information over the USB Bus. Hub devices ("Hubs") 110-113 are special USB devices that act as expansion points for the USB, providing a connection to other USB devices. Each Hub comprises some USB ports, P1-P4, to which other USB devices (Functions and/or Hub devices) may be connected.

The USB tiered-star topology consists of individual tiers, which are defined in accordance to the number of USB Hubs that connect them to Host Hub 110 (the root Hub). The tiered-star topology shown in FIG. 1 comprises four (4) tiers. The first tier is referred to as Tier 1. Tier 1 comprises Host Hub 110 embedded within Host 100. The second tier, Tier 2, comprises the devices that are connected to Host Hub 110 (i.e., Function F1 and Hub 111). The third tier, Tier 3, comprises the USE devices that are connected to Hub 111 in the second tier (i.e., Hub 112, Hub 113, Functions F2 and F3). The fourth tier, Tier 4, comprises the USB devices that are connected to Hub 112 and to Hub 113 of the third tier (i.e., Functions F4, F5, and F6). The USE tiered-star topology supports up to six (6) tiers, and may accommodate up to one hundred twenty seven (127) peripheral devices.

The tiered topology prevents circular attachments. Information travels between Host 100 and the USE devices in the form of data packets. The communication is carried out in a token polling environment. Data packets moving from a USE device to Host 100 (input devices) are actually moving in an "upstream" direction, while data packets moving from Host 100 to the USE devices (output devices) are actually moving in a "downstream" direction.

Functions may have different communication flow requirements in accordance with the functionality of a specific device. To improve the utilization of the USE, different communication flows are handled separately. This is carried out by defining endpoints ("Endpoints") in each device to identify the different aspects of each communication flow. Endpoints are unique identifiable portions of a USB device. Each communication flow is actually performed between Host 100 and an Endpoint by utilizing some bus resources.

USB devices may be addressed physically, electrically, and logically. A logical device entity in the USB system consists of a collection of Endpoints. Information travels to and from logical devices through USB pipes. A USB pipe is an association between an Endpoint on a device and Client Software 101 on Host 100. Pipes are utilized to move data between Client Software 101 and device Endpoints. The data may travel through a USB pipe (1) by utilizing a stream mode in which the transmitted data has no USB defined structure, or (2) by utilizing a message mode in which the transmitted data has some USB defined structure.

In a polled bus USB Host Controller 103 initiates all data transfers. A transaction starts when USB Host Controller 103 sends a USB Token Packet (also referred to as a "Token") describing the type and direction of a transaction, along with the USB device address and Endpoint number. The direction of data transfer is specified in the USB Token Packet. The source of the transaction then sends a data packet or indicates that it has no data to transfer. The destination, in general, responds with a handshake packet indicating whether the data transfer was successful.

Each Endpoint is characterized by its bus access requirements. These include the Endpoint frequency and latency requirements (i.e., how often it should be accessed), bandwidth requirements, maximum packet size, and Endpoint number. These are all utilized to determine the type of transfer required between Host 100 and the USB device. Each USB device is required to have a default Endpoint (also referred to as Endpoint zero (0)) which is utilized to initialize and configure the logical device and to provide access to its configuration and status information.

Host 100 queries the USB Hub port status information for indications of attachment or removal of USB devices. When a new USB device is attached to one of the Hub ports, Host 100 enables the Hub port to which the new device is connected. After a Hub port is enabled, Host 100 communicates with the attached device using the default address (i.e., address zero (0)). This default address is used for assigning the attached device its unique address, using a special packet containing the new address that is sent to the default address. Since Host 100 only enables one port at a time (onto which only one device is present), Host 100 can parse through a tree one port and one device at a time and assign unique addresses to each device.

For each device connected, Host 100 determines if the new device is a Hub or a Function. The Endpoints of the device are determined and defined at the time of attachment, during which each Endpoint is assigned a unique identifier, referred to as the Endpoint number. The Endpoints are designed only for one direction of communication flow (i.e., either in the upstream direction or in the downstream direction). In this fashion, each Endpoint may be uniquely referenced utilizing its device address, Endpoint number, and communication flow direction.

USE devices may comprise several Functions in one physical device. A USB device that has a single address and supports multiple functions utilizing different Endpoints is referred to as a "multi-function" device. On the other hand, several Functions may be comprised in a physical device utilizing an embedded USE Hub, which is referred to as a "composite" device. In this case, however, the different Functions are connected to the USB through the embedded Hub ports, and as such, each Function is assigned a unique address.

FIG. 2 schematically illustrates an exemplary communication flow in a logical domain of a USB system. Client Software 101 utilizes memory buffers 211-214 to receive and transmit information over the USB. As shown in FIG. 2, memory buffers 211-213 are attached to the Endpoints ("EPs") 231-233 of USB device 200 utilizing "one directional" communication flow pipes 221-223.

Memory buffers 211-214 are assigned from the shared memory of Host 100, and therefore, the contents of memory buffers 211-214 are visible to other entities of Host 100. More particularly, any program that operates on Host 100 may access USB memory buffers 211-214, and read and manipulate their contents. Such accessibility is not desired, especially when a USB is utilized to receive or transmit information of a confidential nature. It should be noted that all the information that travels over a conventional USB is handled the same way, meaning that currently there is no way to distinguish between the different classes of information that may be transferred.

For example, in e-commerce applications a buyer is required to type in the details of his or her credit card and identification numbers by utilizing the keyboard. The information then travels to Client Software 101 through a memory buffer that is located in the shared memory of Host 100. It is often desirable to protect this information using a secure link, in which confidential information can travel safely, between the software of Host 100 and the peripheral devices. It is well known that "hackers" utilize special programs known as "snoopers" to eavesdrop and monitor data flow on Host computers.

As part of the USB device class definitions, a device class for Content Security Devices is defined, as described in http://www.usb.org/developers/data/devclass/ContentSecurity_v1_0.pdf. This specification defines a framework for transferring secure information over a USB according to different Content Security Methods (CSMs). These CSMs are supported by basic services to allow controlling the security method and associating it with a particular data transport channel. More details concerning a CSM-1 method and a CSM-2 method can be found in http://www.usb.org/developers/data/devclass/csm1_v1_0.pdf and in http://www.usb.org/developers/data/devclass/csm2_v1_0.pdf.

Although secure channels are established utilizing CSM, this approach utilizes host buffers for all of the services it provides. Therefore, all of the transactions taking place are still visible to other entities within Host 100 or even to other Hosts in the network.

In conventional USB systems the communication always flows through a Host system. However, it is often required to transfer information between two peripheral devices mounted outside a Host system. This kind of communication flow, directed from one peripheral device to another, is implemented by utilizing Host system resources, and therefore consumes memory resources, USB bandwidth, and processor running time.

The USB system described above has not provided a satisfactory solution to the problem of providing a secure method of transferring data between attached devices and applying different classes of confidentiality to its content. In particularly, there is no way to utilize a conventional USB to transfer information between attached devices without passing the information through Host memory buffers. As previously mentioned, it is known that Host memory buffers are not secure.

It is therefore desirable in the art to provide an apparatus and method for ensuring the secure transmission of information through a Universal Serial Bus (USB).

SUMMARY OF THE INVENTION

It is an object of the present invention to provide an apparatus and method for providing a secure Universal Serial Bus (USB) link in which data may travel between peripheral devices, and the Client Software of a Host, and not be accessible to any component of the Host.

It is another object of the present invention to provide an apparatus and method for providing a secure USB link in which data may flow between peripheral devices without utilizing Host resources.

It is a further object of the present invention to provide an apparatus and method to enable a USB system to distinguish between different security levels of data transferred through a Universal Serial Bus (USB), and thereby enable the data to be classified.

Other objects and advantages of the invention will become apparent as the description proceeds.

The present invention is directed to a method for providing a secure USB that enables the secure concealment and transfer of information to or from one or more devices connected to a Host computer that may be connected to other Host computers in a data network. The term "Host" means any computer that has full two way access to other computers on a communication network. One or more Hosts supporting USB input/output (I/O) devices are provided. Each device comprises a Universal Serial Bus (USB), USB client software, and USB system software. A secure domain is created in which confidential outgoing data flows are either blocked or are forwarded as encrypted data, while other remaining data flows are transparently forwarded by storing each data packet sent from, or received by, the secure domain in a memory that contains a set of buffers. Each of the buffers comprises data that is associated with the Host or with the device. Commands and/or requests for information received in the secure domain are transparently forwarded to the corresponding devices. Each data packet sent from the devices to the secure domain is classified to a first data type that requires no intervention, or to a second data type that requires intervention according to the buffer association. Data packets of the first type that are originated at the devices are transparently forwarded to the Host. Data packets of the second type are blocked, or forwarded in an encrypted form. Any exchange of data between the Host and a device is forced to flow through the secure domain.

Blocking or forwarding encrypted data packets of the second type is carried out by interrogating the header of each data packet of the second type to reveal the type of information required from a device. If the information is required at another Host for further action, the information is transferred in an encrypted form. If the information is required for data verification, the data packet is blocked. Verification information is received in an encrypted form and is decrypted by the device. The encrypted verification information is compared with the information received from the device. The device provides an indication verifying a match or a mismatch.

According to an advantageous embodiment of the invention, secure information is transferred between a Host and a secure domain in an enciphered form, thereby establishing secured data channels between the secure domain and the Host. Data sent between devices flows directly through the secured domain, without utilizing Host resources.

The present invention is also directed to an apparatus for providing a secure USB that enables the secure concealment and transfer of information to or from one or more devices connected to a Host computer that may be connected to other Host computers in a data network. One or more Hosts supporting USB input/output (I/O) devices are provided. Each device comprises a Universal Serial Bus (USB), USB client software, and USB system software. A secure domain is created in which confidential outgoing data flows are either blocked or are forwarded as encrypted data, while other remaining data flows are transparently forwarded by storing each data packet sent from, or received by, the secure domain in a memory that contains a set of buffers. A set of USB devices is provided. In addition, a first set of data channels is provided for exchanging data with each of the USB devices, and a second set of data channels is provided for exchanging data between the secured domain and the Host.

According to an advantageous embodiment of the present invention, the secure domain resides within a Host. This embodiment comprises a USB bus, a memory attached to the USB bus for storing each data packet sent from, or received by, the secure domain, in which the memory contains a set of buffers, and in which each of the buffers contains data associated with the Host or with the device. Circuitry attached to the USB bus is utilized to forward commands and/or requests for information received in the secure domain to the corresponding devices. A processor or other special purpose hardware is also attached to the USB bus, for classifying data packets and for controlling forwarding and/or encrypting operations. A USB Host controller attached to the USB bus is utilized for managing data flow between the Host and the USB devices. The term "USB Host controller" includes and refers to a hardware device that interfaces with a Host controller driver.

According to another advantageous embodiment of the present invention, the secure domain is attached to the USB, external to the Host, and appears to the USB as a Hub or a composite device. This embodiment comprises a USB bus, a memory attached to the USB bus for storing each data packet sent from, or received in, the secure domain, in which the memory contains a set of buffers, and in which each of the buffers contains data associated with the Host or with the device. Circuitry attached to the USB bus acting as a USB node is utilized to forward commands and/or requests for information received in the secure domain and addressed to the devices within the secure domain. A processor is also attached to the USB bus for classifying data packets and for controlling forwarding and/or encrypting operations. A USB Host controller attached to the USB bus is utilized for managing data flow between the Host and the USB devices within the secure domain.

The system of the present invention may further comprise a Virtual Conduit Interface utilized to connect between the secure domain and one or more non-USB devices, and to effectively provide a secure USB that enables the secure concealment and transfer of information to or from one or more non-USB devices.

The foregoing has outlined rather broadly the features and technical advantages of the present invention so that those skilled in the art may better understand the Detailed Description of the Invention that follows. Additional features and advantages of the invention will be described hereinafter that form the subject matter of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the Detailed Description of the Invention, it may be advantageous to set forth definitions of certain words and phrases used throughout this patent document: The terms "include" and "comprise" and derivatives thereof, mean inclusion without limitation, the term "or" is inclusive, meaning "and/or"; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, to bound to or with, have, have a property of, or the like; and the term "controller," "processor," or "apparatus" means any device, system or part thereof that controls at least one operation. Such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document. Those of ordinary skill should understand that in many instances (if not in most instances), such definitions apply to prior, as well as future uses of such defined words and phrases.

BRIEF DESCRIPTION OF THE DRAWINGS

For a more complete understanding of the present invention, and the advantages thereof, reference is now made to the following descriptions taking in conjunction with the accompanying drawings, wherein like numbers designate like objects, and in which.

DETAILED DESCRIPTION OF THE INVENTION

The present invention provides a secure USB apparatus and method for establishing a secure USE link to USB input/output (I/O) devices. According to an advantageous embodiment of the present invention, a secure USE domain is established by utilizing an independent memory device and an independent processor dedicated to an implementation of secure USE links. The content and the operational state of the secure domain device are not accessible by other parts of a Host computer. This feature eliminates the exposure of secured information to other entities resident in the Host computer. Moreover, the utilization of separate storage and preprocessing units results in freeing up Host resources. As will be explained more fully below, the utilization of separate storage and preprocessing units may be expandable to other solutions.

The present invention selectively transfers data into the Host memory. In particular, a dedicated processor is utilized in the secure USE implementation. The dedicated processor selectively transfers packets of information from memory buffers in the memory of the secure USE device to Host memory buffers. In this manner, information that originates at the Endpoints of the USE devices (in the secured domain) is transferred through a conventional USB pipe to the secured USB memory device. The information is filtered in the secured USB memory device prior to any further transactions being executed by the dedicated processor. The filtering of the information packets enables portions of information (i.e., packets) moving in the upstream direction to reach the Host memory buffers, unless the packets were identified as containing classified information.

A secured communication flow is terminated at the secured USB memory buffers. The secure USB processor manages all the operations required to handle transactions with the Client Software, to which the communication flow is destined. In this manner, secured information may be handled without exiting the secure USB memory device. In other words, the present invention establishes a secured USB domain in which classified information is exclusively handled, and in which other types of information are enabled to reach the Host memory buffers.

Figure 1:
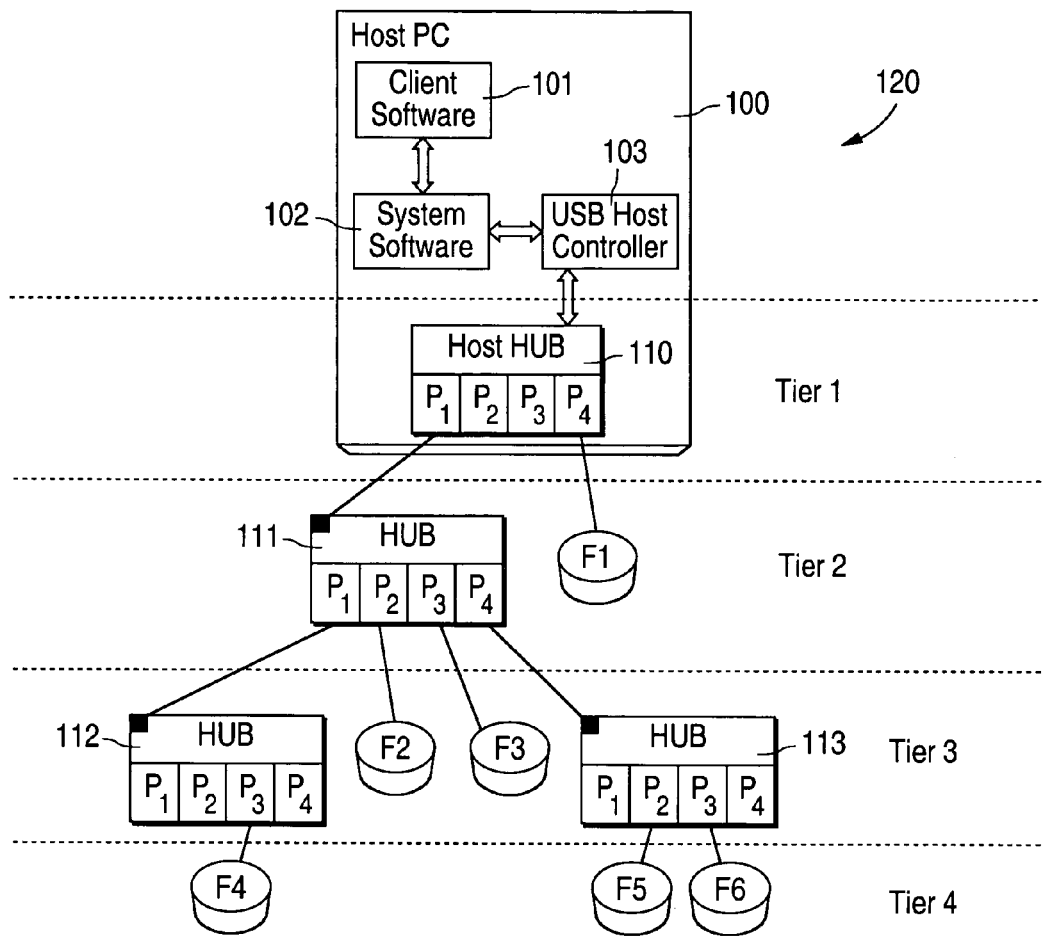
FIG. 1 schematically illustrates an exemplary tiered-star USB topology.
Figure 2:
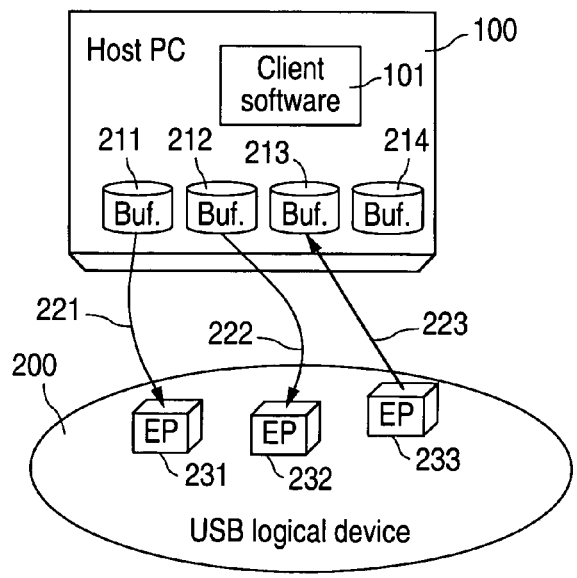
FIG. 2 schematically illustrates an exemplary communication flow in a logical domain between USE client software and a USB device.
Figure 3A:
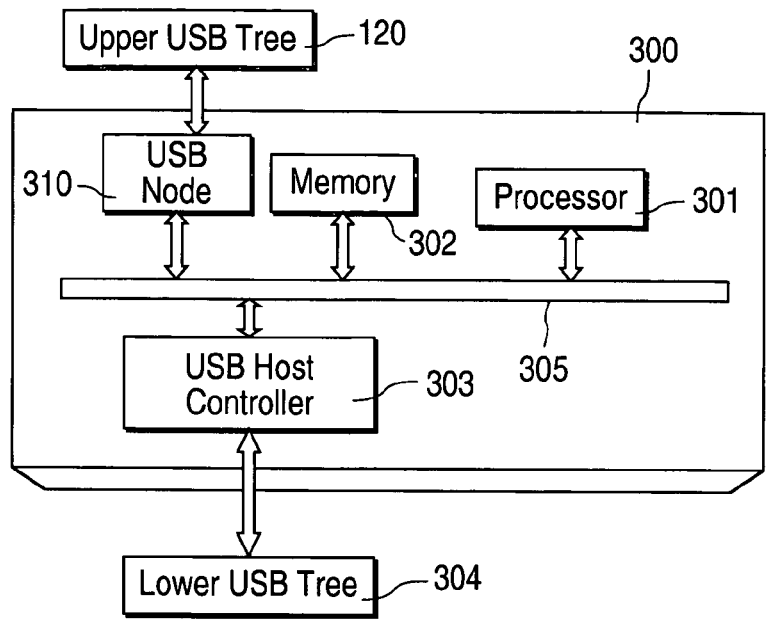
FIG. 3a schematically illustrates a USB bridge according to one advantageous embodiment of the present invention.

FIG. 3a schematically illustrates a USB Bridge 300 according to an advantageous embodiment of the present invention. USB Bridge 300 is connected to Upper USB Tree 120 utilizing a conventional USB link (i.e., through USB Hubs, not shown). Upper USB Tree 120 comprises a Host and the USB devices that are attached to the Host in a conventional USB system (in a manner similar to that of the USB system illustrated in FIG. 1). Lower USB Tree 304 is also connected to USB Bridge 300 through a USB Hub (not shown). Lower USB Tree 304 comprises conventional USB devices attached to USB Bridge 300 in a conventional USB tiered-star topology.

Devices in Lower USB Tree 304 operate in the secured domain so that communication flow that originates in the input/output (I/O) devices of Lower USB Tree 304 is filtered at USB Bridge 300 before further transactions with Upper USB Tree 120 can take place. However, it should be understood that Lower USB Tree 304 consists of conventional USB devices that instead may be connected to Upper USB Tree 120. In other words, the operation of each of the USB devices in Lower USB Tree 304 is completely standard, utilizing standard I/O operational methods (e.g., Endpoints, pipes, etc.).

USB Bridge 300 is coupled to Upper USB Tree 120 through USB Node 310. USB Node 310 appears to Upper USB Tree 120 either as a multi-function device or as a composite device. However, USB Bridge 300 appears to Lower USB Tree 304 as a USB root Hub. In fact, USB Bridge 300 operates in a manner similar to that of a USB Host, utilizing its own USB Host Controller 303 and an independent memory device 302. USB Bridge 300 operates with its own USB Bus 305 (which is not shared with the devices of Upper USB Tree 120).

USB Host Controller 303 carries out all the USB tasks required for Lower USB Tree 304 transactions, as if USB Host Controller 303 were the USB root Hub of a Host. Communication flow that originates at Lower USB Tree 304 is performed through pipes that originate at the devices of Lower USB Tree 304 and terminate in memory buffers in memory device 302 of USB Bridge 300. USB Bridge Processor 301 carries out the rest of the communication tasks and actually enables secure transactions to take place. In order to filter and block off particular Endpoint data, USB Bridge Processor 301 is required to determine how to handle each of the received packets.

Each of the USB devices in the secured domain (i.e., in Lower USB Tree 304) may contain attributes for local processing of information on certain Endpoints. These attributes are reflected in the header of each data packet that is output from each device within the secured domain. USB Bridge Processor 301 interrogates each data stream and performs any necessary translation (i.e., respective processing according to the attributes) to enable the Client Software to perform further transactions in order to complete the tasks regarding the information packet. For example, in a password verification scenario, according to one advantageous embodiment of the present invention, the password that was typed by the user does not leave the secured domain. The password is transferred to USB Bridge memory 302, and is handled by USB Bridge Processor 301, to verify a correct password and provide the proper indication.

Figure 4:
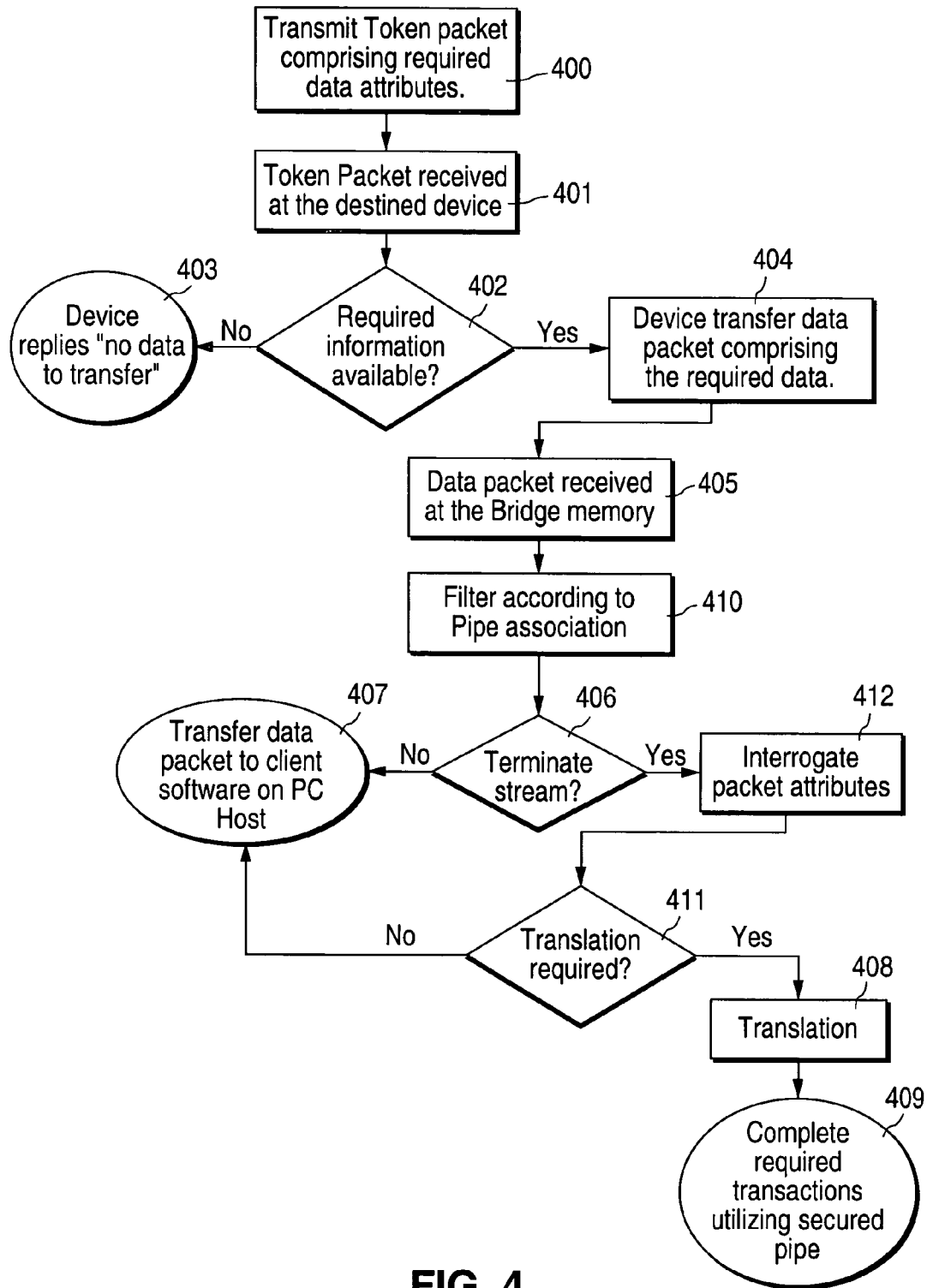
FIG. 4 is a flow chart illustrating a method for providing a secure USB according to one advantageous embodiment of the present invention.

A method for transferring secured information over a secured USB system according to one advantageous embodiment of the present invention is illustrated in the flow chart of FIG. 4. The Host, like does a Host in a standard polled bus system, initiates transactions. Following the standard USB protocol, the communication stream is initiated and a USB Token Packet ("Token") is sent from the Host to the addressed device (step 400). The Token comprises the destined device address and the Endpoint number on the device. Additionally, the Token comprises attributes concerning the type of communication that is required. The Token is received at the destined device (i.e., the addressed device) (step 401). The device receiving the Token then determines whether the required information is available at that time and replies accordingly (decision step 402).

If the information is not available, the device replies by sending a packet indicating a "no data to transfer" state (step 403). Otherwise, the required data is sent in the form of a Data Packet (step 404). All the steps are in accordance with the standard USB protocol, and typically, in such scenarios the process is terminated when the Data Packet is received at the Host. However, if the destined device belongs to the secured domain, the Data Packet is received at USB Bridge memory 302 (step 405). Upstream communication streams that originate in the secured domain (Lower USB Tree 304) are either terminated, or forwarded at USB Bridge 300 (i.e., filtering).

One of the tasks of USB Bridge Processor 301 is to filter the upstream information arriving from the Lower USB Tree 304 (step 410). The filtering is performed so that some communication flows are forwarded and other communication flows are terminated at USB Bridge 300. Filtering is determined immediately based on the pipe number (i.e., the source of the information) that was utilized to deliver the information to USB Bridge memory 302. More particularly, USB Bridge Processor 301 simply verifies that the device address and the Endpoint number are not identified as sources of secured information.

A determination is then made whether to terminate the stream or to forward the received information (decision step 406). If it is determined that the information is to be forwarded, then USB Bridge 300 passes the information to Upper USB Tree 120 as is, incurring a minor delay in the communication flow (step 407). If the pipe that was utilized to transfer the information to USB Bridge 300 originated from the device's Endpoint that may be the source of secure information, then USB Bridge Processor 301 further interrogates the received Data Packet in order to reveal the type of information that is being transferred (step 412).

By examining the Data Packet attributes, USB Bridge Processor 301 interrogates the filtered information to reveal its content type. From the attributes a determination is then made whether further translation is required (decision step 411). For example, if the Data Packet contains characters that were typed on a USB keyboard, and the destined Client Software is a simple text editor, then it is most likely that no translation is required (though it may be otherwise defined). When no translation is required, control passes to step 407 and the data is forwarded to Upper USB Tree 120 as previously described.

For a secure transaction, the translation process is performed (step 408). USB Bridge Processor 301 is required to carry out the corresponding actions that will enable the Host to utilize the information received at the secured domain memory device (step 409). Of course, confidential information must be handled very carefully, and must not leave the secure domain in an unprotected form. In the case of password verification, the Client Software transfers the expected password, possibly in an encrypted form, to USB Bridge 300, utilizing a secure pipe. A secure pipe, according to an advantageous embodiment of the present invention, is a pipe in which key cryptography (or some other similar type of enciphering) is utilized to conceal the information transferred. Now the task of USB Bridge Processor 301 is to decipher the received expected password, compare the two received passwords and indicate to the Client Software the results of the comparison (i.e., verify that the password is correct or is not correct).

This example is only one illustration of many possible ways in which a secure link may be used to carry out Client Software tasks involving confidential information. Other implementations are also possible. For example, it is very important to be able to keep information confidential in electronic commerce (e-commerce) transactions in which a user discloses his or her credit card numbers and other identifying information. In such an implementation, the confidential information (i.e., credit card numbers and identification information) is enciphered and transferred from USB Bridge 300 to the Client Software. In such a case, the deciphering process will most probably be carried out only when the enciphered information arrives at a destined secure domain (e.g., a Bank computer system).

The implementation of the present invention described above is suitable for implementations that are external to a Host. Implementations of the present invention that are external to a Host occupy a position with respect to the Host that is similar to the position occupied by USB Hubs in a standard USB topology.

Figure 3B:
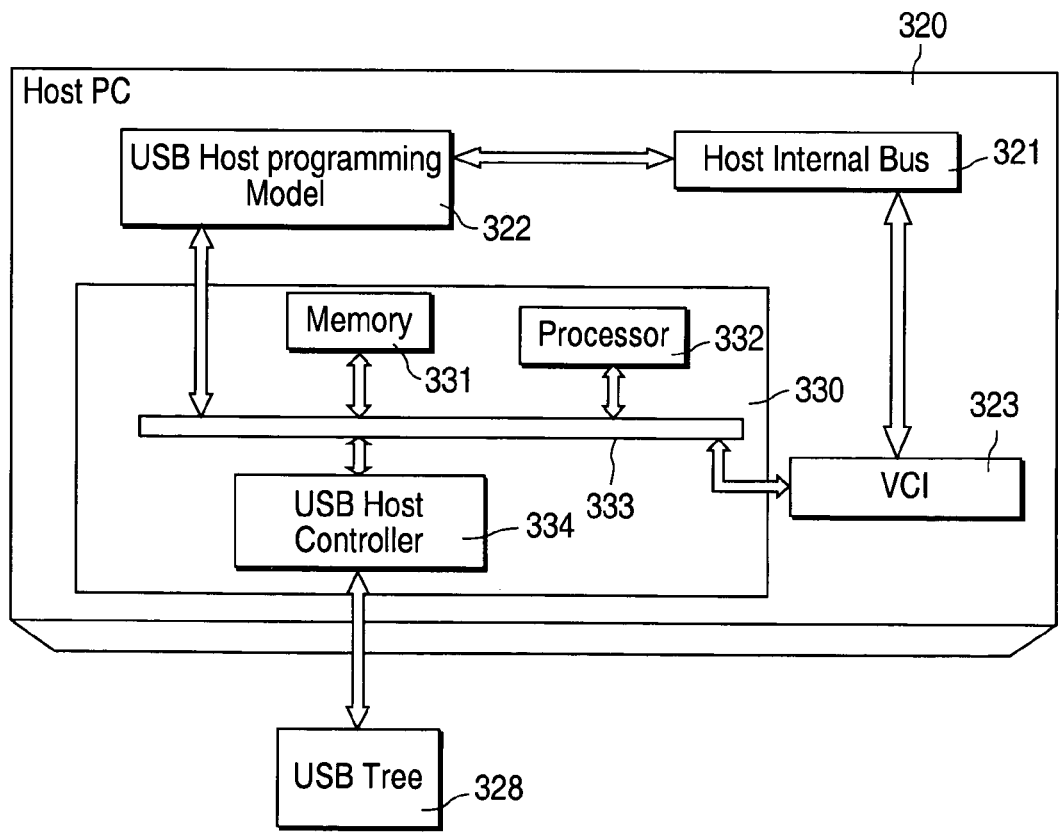
FIG. 3b schematically illustrates a secure USE for use within a Host computer according to one advantageous embodiment of the present invention.

An alternative advantageous embodiment of the present invention that is designed to be included within a Host is schematically illustrated in FIG. 3b. In this embodiment a secure domain 330 is embedded within Host 320. Similar to the secure domain of USB Bridge 300, secure domain 330 comprises a dedicated USB Bridge memory device 331 and a dedicated USB Bridge processor 332. The functionality of USB Bridge memory device 302 and USB Bridge memory device 331 is exactly the same. The functionality of USB Bridge processor 301 and USB Bridge processor 332 is also exactly the same. Secure domain 330 also comprises USB Host Controller 334 that performs all the required USB tasks. The functionality of USB Host Controller 303 and USB Host Controller 334 is exactly the same. USB Bus 333 couples the components of secure domain 330.

Host Internal Bus 321 is coupled to USB Bus 333 of secure domain 330 through USB Host Programming Model 322. USB Host Programming Model 322 may be any programming model for interfacing between USB Host Controller 334 and the Client Software on the Host system, such as an Open Host Controller Interface (Open HCI). USB Tree 328 is a conventional tiered-star USB topology (of the type illustrated using USB Hubs 110-113 and Functions F1-F6 in FIG. 1). In one embodiment USB Tree 328 is coupled to USB Bus 333 through a USB Hub (not shown). As shown in FIG. 3b, USB Tree 328 may be coupled to USB Host Controller 334.

Host Internal Bus 321 is also coupled to USB Bus 333 of secure domain 330 through Virtual Conduit Interface (VCI) 323. VCI 323 is a combination of hardware and software that provides an interface that emulates a USB host controller interface. By utilizing VCI 323 any device locally connected to the embedded processor/memory complex can appear as a regular USB device. For example, if a keyboard scanner is present on the internal processor core bus, or on an associated peripheral bus, a combination of embedded software and hardware can make this keyboard appear as a standard USB keyboard. Like a Host controller, VCI 323 gains access to the Host's address space and maintains USB Host Programming Model 322. Secure transactions with legacy devices can then take place by abstracting the legacy devices parameters and making the devices appear as if they were attached to a USB tree.

In the alternative embodiment shown in FIG. 3b, all USB devices reside in secure domain 330. Additionally, non-USB devices may be accessed utilizing secure domain 330 while maintaining the USB style software interface. This provides a low cost and flexible implementation. Since no additional USB hardware is required, this embodiment is considered to be a very advantageous embodiment of the invention. A USB Node controller of the type used in USB Bridge 300 is not required in this alternate embodiment. In addition, the implementation of USB Host Controller 334 can largely be accomplished in firmware. This means that the tradeoff between the performance of the solution and the amount of dedicated hardware support required will be determined only by the application requirements.

In a similar fashion, as in the embodiment described above for USB Bridge 300, for each device attached, parameters are provided by the Host driver to determine how to handle the data flow within each attached device. However, in the secure domain 330 embodiment embedded within a Host, connections to non-USB devices through secure domain 330 are also supported. These include applications such as bridging to legacy devices (based on older technology for which compatibility continues to be maintained), communication devices, media devices and specialized data acquisition devices, while maintaining the USB software interface.

Utilizing the invention will also provide solutions for applications in which communication flow between devices may be performed without any Host interference. In such streaming applications, in which the source and destination of the data are not necessarily within the personal computer (PC) (e.g., data/audio and video streaming), keeping communication flow within the confines of the secure domain reduces the storage and bandwidth requirements in the Host as well as delay implications for the application. This effectively increases the overall system performance.

The above examples and description have been provided only for the purpose of illustration, and are not intended to limit the invention in any way. As will be appreciated by the skilled person, the invention can be carried out in a great variety of ways, employing more than one technique from those described above, all without exceeding the scope of the invention.

What is claimed is:

1. An apparatus for providing a secure serial bus (USB) comprising a secure channel for transferring data, wherein said apparatus comprises a secure USB domain device coupled to an external host computer, wherein said secure USB domain device comprises elements that are not accessible by said external host computer.

2. The apparatus as claimed in claim 1 wherein said secure USB domain device comprises:
    a USB memory device that is not accessible by said host computer;
    a USB processor that is not accessible by said host computer;
    a USB host controller that is not accessible by said host computer; and
    an internal USB bus that couples said USB memory device, said USB processor, and said USB host controller.

3. The apparatus as claimed in claim 2 further comprising a USB node coupled to said USB bus, said USB node capable of being coupled to a USB tree.

4. The apparatus as claimed in claim 1 wherein said apparatus comprises a secure USB domain device embedded within a host computer.

5. The apparatus as claimed in claim 4 wherein said secure USB domain device comprises:
    a USES memory device that is not accessible by said host computer;
    a USB processor that is not accessible by said host computer;
    a USB host controller that is not accessible by said host computer; and
    an internal USB bus that couples said USB memory device, said USB processor, and said USB host controller.

6. The apparatus as claimed in claim 5 further comprising a virtual conduit interface coupled to said secure USB domain device and coupled to at least one non-USB device, said virtual conduit interface capable of providing a secure USB channel for transferring information to said at least one non-USB device.

7. An apparatus for providing a secure universal serial bus (USB) capable of transferring information over a secure channel, said apparatus comprising:
    at least one host computer capable of supporting USB input/output devices, said at least one host computer comprising a USB bus, USB client software, and USB system software; and
    a secure USB domain device capable of at least one of: blocking outgoing data flows of confidential information, forwarding outgoing data flows of encrypted confidential information, and forwarding outgoing data flows of non-confidential information.

8. The apparatus as claimed in claim 7 wherein said secure USB domain device comprises:
    a plurality of USB devices;
    a first set of data channels for exchanging data with each of said plurality of USB devices; and
    a second set of data channels for exchanging data with said at least one host computer.

9. The apparatus as claimed in claim 7 wherein said secure USB domain device is embedded within said at least one host computer.

10. The apparatus as claimed in claim 9 wherein said secure USB domain device comprises:
    a USB bus;
    a memory coupled to said USB bus capable of storing each data packet that is at least one of sent from and received by said secure USB domain device, said memory containing a set of buffers, each of said buffers comprising data associated with at least one of: said at least one host computer and a device coupled to said at least one host computer;
    circuitry coupled to said USB bus, said circuitry capable of forwarding commands and requests for information received in said secure USES domain device;
    a processor coupled to said USB bus, said processor capable of at least one of: classifying data packets, controlling forwarding operations, and controlling encryption operations; and
    a USB host controller coupled to said USB bus, said USB host controller capable of managing data flow between said at least one host computer and a plurality of USB devices.

11. The apparatus as claimed in claim 10 wherein said apparatus further comprises a virtual conduit interface coupled to said secure USB domain device and coupled to at least one non-USB device, said virtual conduit interface capable of providing a secure USB channel for transferring information to said at least one non-USB device.

12. The apparatus as claimed in claim 7 wherein said secure USB domain device is external to and coupled to said at least one host computer.

13. The apparatus as claimed in claim 12 wherein said secure USB domain device comprises:
    a USB bus;
    a memory coupled to said USB bus capable of storing each data packet that is at least one of sent from and received by said secure USB domain device, said memory containing a set of buffers, each of said buffers comprising data associated with at least one of: said at least one host computer and a device coupled to said at least one host computer;

circuitry coupled to said USB bus, said circuitry capable of forwarding commands and requests for information received in said secure USB domain device;

a processor coupled to said USB bus, said processor capable of at least one of: classifying data packets, controlling forwarding operations, and controlling encryption operations; and a USB host controller coupled to said USB bus, said USB host controller capable of managing data flow between said at least one host computer and a plurality of USB devices.

14. A method for providing a secure universal serial bus (USB) capable of transferring information over a secure channel, said method comprising the steps of:

providing at least one host computer capable of supporting USB input/output devices, said at least one host computer comprising a USB Bus, USB client software, and USB system software; and providing a secure USB domain device capable of at least one of: blocking outgoing data flows of confidential information, forwarding outgoing data flows of encrypted confidential information, and forwarding outgoing data flows of non-confidential information.

15. The method as claimed in claim 14 wherein the step of providing a secure USB domain device capable of at least one of: blocking outgoing data flows of confidential information, forwarding outgoing data flows of encrypted confidential information, and forwarding outgoing data flows of non-confidential information, comprises the steps of:

storing each data packet received by said secure USB domain device in a memory containing a set of buffers, each of said buffers comprising data associated with at least one of: said at least one host computer and a device coupled to said at least one host computer;

forwarding commands and requests for information received in said secure USB domain device;

classifying each data packet sent from said device coupled to said at least one host computer to said secure USB domain device to one of: a first data type that requires no intervention and a second data type that requires intervention according to a buffer association;

forwarding data packets of the first type that are originated at said device to said at least one host computer;

blocking data packets of the second type that contain confidential information;

forwarding data packets of the second type that contain encrypted confidential information; and forcing any exchange of data between said at least one host computer and said device coupled to said at least one host computer to flow through said secure USB domain device.

16. The method as claimed in claim 15, wherein the step of blocking data packets of the second type that contain confidential information, and the step of forwarding data packets of the second type that contain encrypted confidential information, comprise the steps of:

interrogating a header of each data packet of the second type to reveal a type of information required;

transferring said information in an encrypted form if the information is required at another host computer for further actions; and if said information is required for data verification:
blocking the data packet;
receiving verification information from said at least one host computer in an encrypted form;
decrypting said verification information;
comparing said decrypted verification information with information received from said device coupled to said at least one host computer; and
providing said at least one host computer with an indication verifying whether a match was detected.

17. The method as claimed in claim 14, wherein secure information is transferred between said at least one host computer and said secure USB domain device in a enciphered form, thereby establishing at least one secure data channel between said at least one host computer and said secure USB domain device.

18. The method as claimed in claim 14, wherein data flows from a first device to a second device directly through said secure USB domain device without utilizing resources of said host computer.

19. The method as claimed in claim 14, further comprising the steps of:

coupling a virtual conduit interface to said secure USB domain device;

coupling said virtual conduit interface to at least one non-USB device; and using said virtual conduit interface to provide a secure USB channel for transferring information to said at least one non-USB device.

* * * * *